Patented Aug. 2, 1932

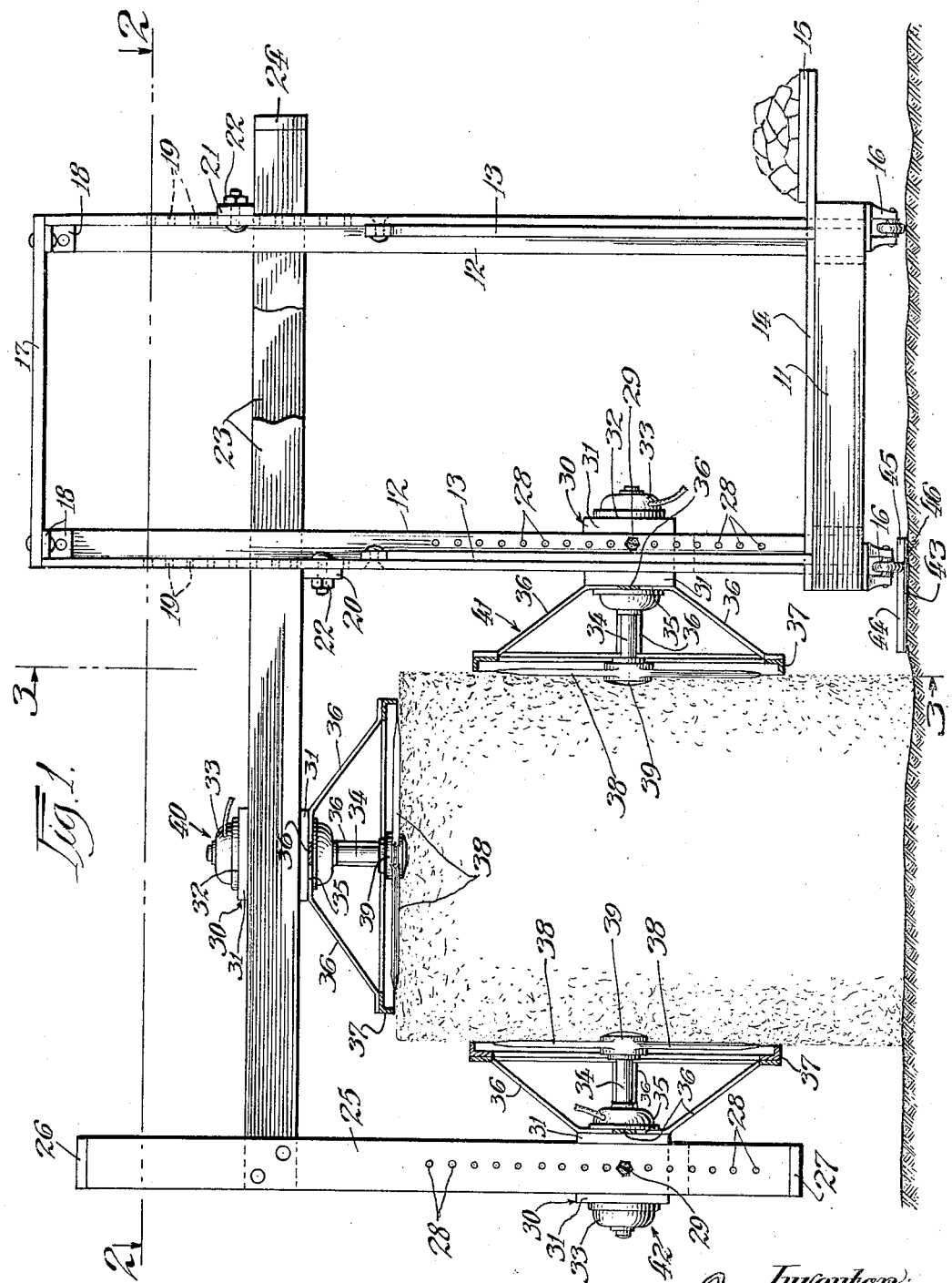

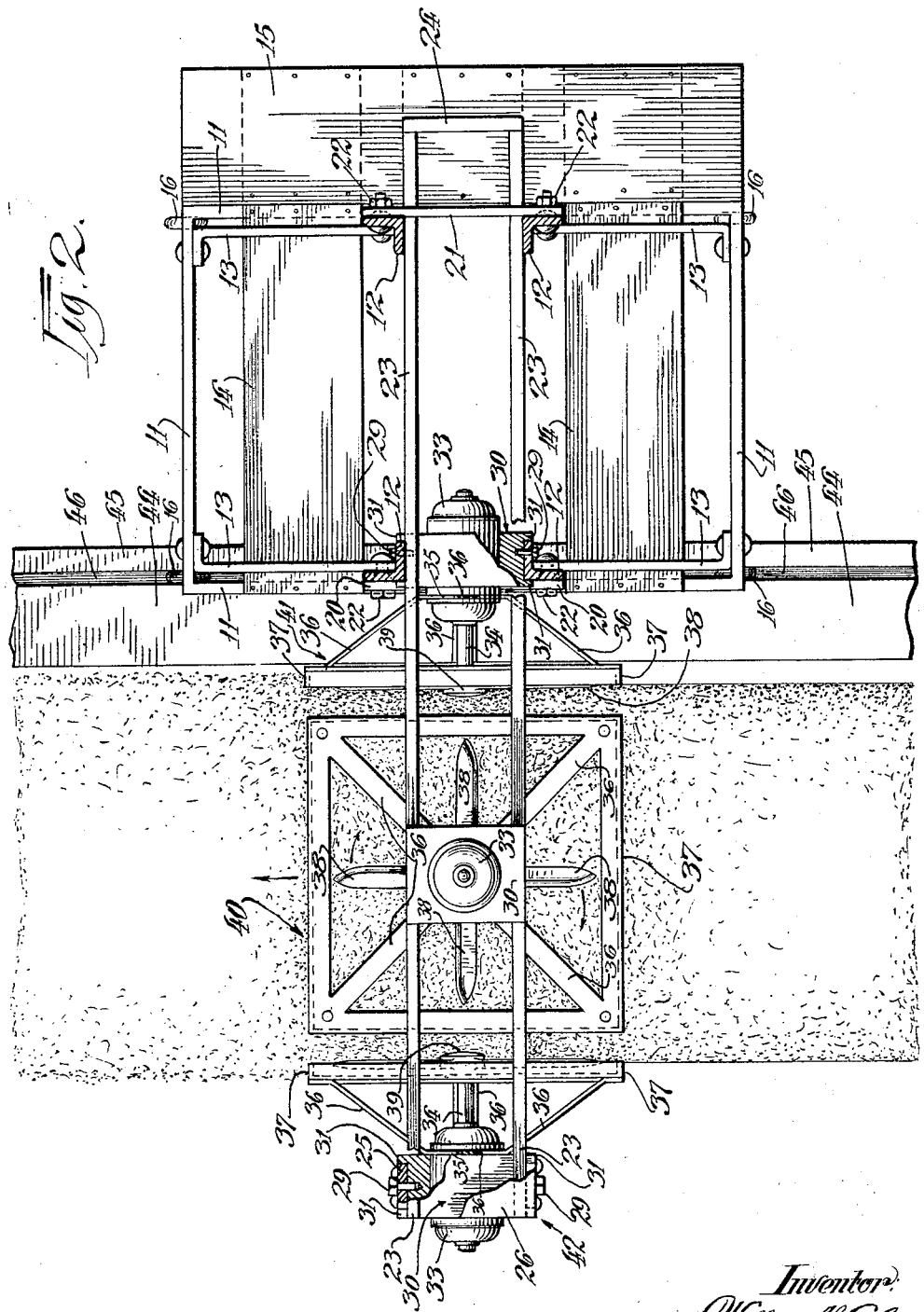

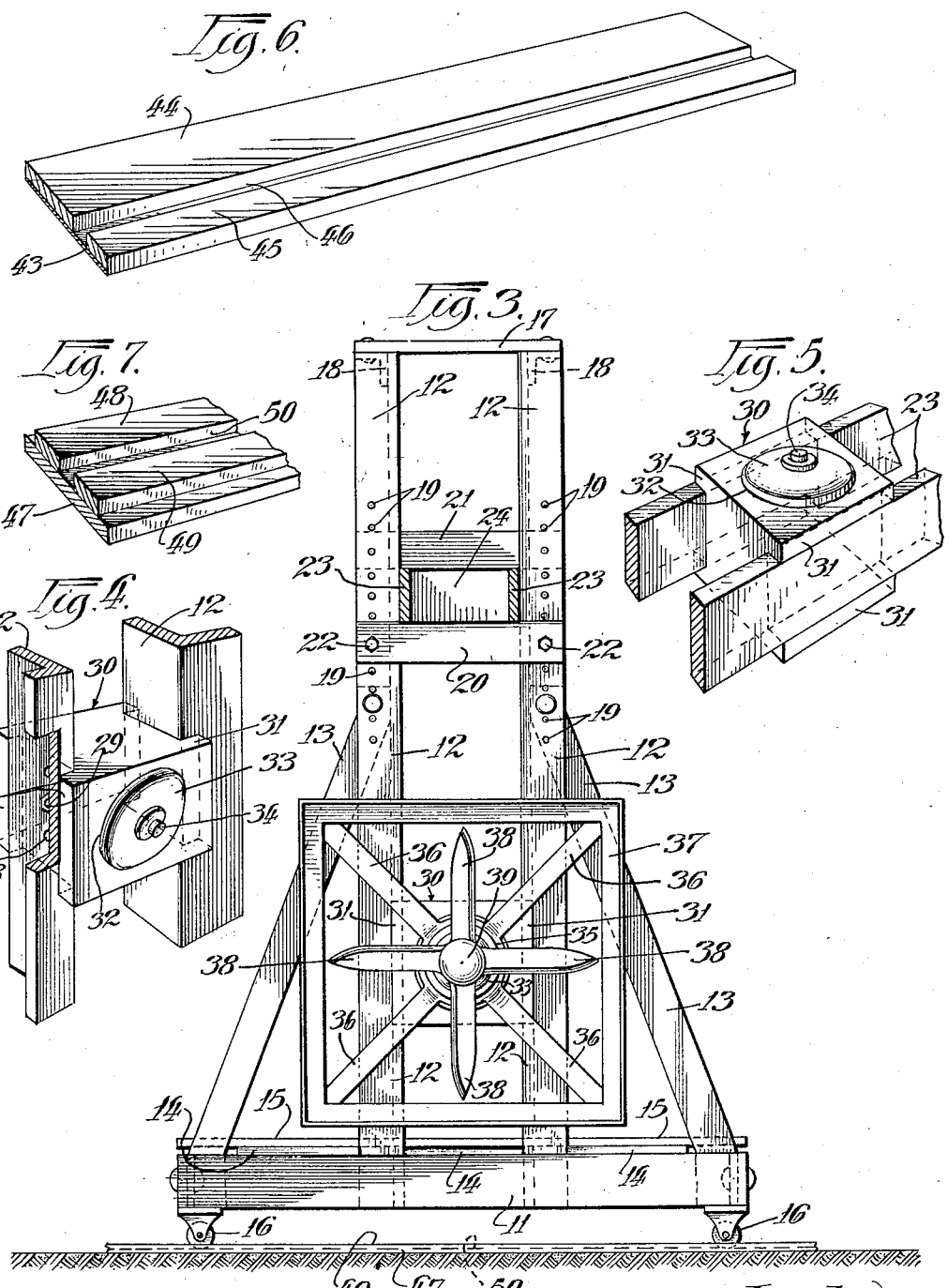

1,869,394

UNITED STATES PATENT OFFICE

WILLIAM H. SIKMA, OF OAKGLEN, ILLINOIS

CUTTING MACHINE

Application filed August 28, 1930. Serial No. 478,353.

This invention relates to cutting machines for cutting or trimming hedges, etc.

The invention has, among other objects, that of providing means for evenly and neatly trimming hedges. The invention relates not only to means for trimming one side of the hedge, but includes means for trimming the tops of hedges, and means for evenly and neatly trimming the front and rear and top of a hedge successively or simultaneously. The invention includes also the provision of means for accomplishing the above results and other results whether the ground upon which the mechanism of the invention is being operated be smooth or rough. Also, the invention has for an object, among others, the provision of mechanism for the above purposes which is easy of operation and simple of construction, and relatively inexpensive in cost of manufacture. The invention further consists in the novel construction and in the parts and combination and arrangements of parts hereinafter described and pointed out in the appended claims.

In the accompanying drawings illustrating a practical adaptation of the invention:—

Fig. 1 is a side elevation showing a machine constructed to trim two sides and top of a hedge simultaneously;

Fig. 2 is a sectional plan view of the machine as applied to a hedge on the line 2—2 of Fig. 1;

Fig. 3 is a vertical sectional view on the line 3—3 of Fig. 1;

Fig. 4 is a fractional perspective elevation of one of the frames carrying a motor showing its vertically adjustable relation.

Fig. 5 is a fractional perspective view of the horizontal guide bars supporting one of the frames carrying a motor, which frame is horizontally adjustable on the guide bars;

Fig. 6 is a perspective view of the guide rail for use on even ground;

Fig. 7 is a perspective view of one of the guide rails used on uneven ground.

Referring to the drawings, numeral 11 designates the quadrangular base of the device, and numeral 12 designates uprights of the main frame, which in the model shown, are in the form of angle irons. The uprights 12 are four in number, and are positioned as clearly shown in Fig. 2.

The numeral 13 shows braces for securing the base to the uprights, and these braces are also four in number in the preferred form. As clearly shown in Fig. 2, a flooring 14 is provided upon the base 11. The flooring 14 is extended beyond the end of the base 11 in the manner shown in Fig. 2. Upon the said extension of the flooring an additional reinforcing layer of flooring 15 is placed to give additional strength to the said extension. The purpose of the extension is to serve as a support for counter-weights, should the same be necessary, and in order to maintain a balance. The extended flooring itself will, of course, in a measure, provide a counter-weight which will in many cases render unnecessary any further counter-weights. The reason for any necessity for a counter-weight, is found in the fact that on the side of the machine opposite to that upon which the extended flooring is placed there is positioned, the means for carrying and operating the motors and knives, and in certain cases, especially in the case of a broad hedge and in cases where all sides of a hedge are being cut simultaneously, it might be found that the leverage and the weight might be so great as to overbalance the device without a counter-weight.

The base 11 is provided with casters 16. Top braces 17 are connected to the uprights 12 by means of angles 18. The uprights 12 are provided on their front and rear sides with a plurality of apertures 19 as shown in Fig. 3. The purpose of these apertures is to enable a cross bar 20 to be positioned at desired heights. Cross bar 20 is also provided with apertures, and in operation the apertures of the cross bar 20 are placed in registry with the aperture located at the desired height. Cross bar 20 is then secured to uprights 12 by means of bolts 22 which are inserted in the apertures of the cross bar 20, and also into the registering apertures of the uprights 12. The rear uprights are similarly provided with like apertures to enable a rear cross bar 21 to be positioned at a desired height on the rear uprights 12 in like manner by means of additional bolts.

The numeral 23 illustrates the sides of a horizontally movable support, and numeral 24 indicates the rear portion linking the sides 23 as shown in Fig. 2.

Detachably adjusted to the sides 23 of the horizontally movable guide are the sides 25 of a vertical guide to provide support for a motor and blade equipment and to provide means for the vertical adjustment of the same. The guide last referred to is for use when the inner side of a hedge is to be trimmed. The sides 25 are linked together by a top brace 26 and a bottom brace 27. The sides 25 are provided with apertures 28 to receive bolts 29 for securing the frame containing the motor and cutting equipment which will be referred to hereinafter.

The numeral 30 shows a frame for containing a motor, and for giving support to the cutting equipment as clearly shown in Figs. 1 and 2. The frame 30 is provided with flanges 31 to retain said frames in parallel vertical correspondence with the sides 25. The frames 30 are provided with bores 32 containing the motor 33 therein. Said motor is connected to a shaft 34. On the shaft 34 there is a ring 35 provided with arms 36 to support a frame 37. The shaft 34 is provided with blades 38 at its end, and a head 39 to secure the blades 38 on the shaft 34. The purpose of the frame 37, which is used in cooperation with the blades 38, is to press the material to be cut so that the blades may operate evenly and neatly on the subject matter. As stated hereinbefore by virtue of this invention, means may be provided for trimming a hedge on the front, top and rear sides simultaneously. In order to accomplish this, it is necessary to have three units, such as were described in connection with the frame 30, the motor 33, the shaft 34, the ring 35, arms 36, frame 37, blades 38 and head 39. When three of these units are used simultaneously, they may be positioned as shown in Fig. 1 where numeral 40 illustrates one of these units which is employed in trimming the top of the hedge. A second unit is designated at 41 for trimming the front side of a hedge. A third unit is designated at 42 for trimming a rear side of a hedge. All of these units are essentially alike, and in each case the frame 30 for containing the motor is provided with apertures which may be placed in registry with the apertures of the vertical supports or uprights at the desired height to receive the pegs which will secure the frame 30 to the guide or uprights as the case may be. The frames are so constructed with flanges to permit easy slidable adjustment vertically on the guides or uprights as shown in detail in Fig. 4.

Apertures need only be used when the cutting mechanism is being employed in cutting the front or rear sides of a hedge. When the top of a hedge is being trimmed, it is not necessary to employ apertures, inasmuch as the frame 30 by virtue of the flanges 31 will be supported thereby on the sides 23 of the horizontally movable guide. The frame 30 in such case will be capable of laterally adjustable movement between the said sides 23. The foregoing is clearly illustrated in Fig. 5.

In Fig. 6 there is shown a guide which is used in cooperation with the devices when the same is being operated on smooth or even ground. This guide is comprised in the preferred form shown of a bottom plate 43, and two guide plates 44 and 45 which are so positioned on the bottom plane as to create a groove 46 to accommodate the travel of the casters 16 adjacent to the hedge which is to be trimmed. This guide is placed in operation parallel to the hedge which is to be trimmed, and is positioned accordingly to the depth to which the hedge is to be trimmed. By virtue of this guide the casters are compelled to travel in a perfectly straight line, and thereby even and neat trimming of the hedge is effected.

When the ground upon which the device is to be operated is not even two rails are provided in the preferred form. One of these rails is illustrated in Fig. 7 in which there is a bottom plate 47 and two guide plates 48 and 49 which are so positioned as to provide a groove 50. In operation these rails are placed at a desired distance in parallel relation to the hedge to be cut. The casters of the side of the main frame adjacent to the hedge will travel in one of the rails, while the casters on the other side of the device will travel in the other rail in a corresponding manner. By means of this arrangement vertical deviation of the cutting mechanism will be eliminated, and the unevenness of the ground will not be a bar to the evenness and trimming of the hedge.

In operation, the first step is preferably to decide whether it will be advisable to use a guide member or a pair of rails. If the ground is even it should be sufficient to use a guide member as there will be no likelihood of vertical deviation in cut, and the only danger will result from lateral deviation which will prevent the hedge from being evenly and neatly cut. By use of the guide member, in which the caster of the device rides, the cutting mechanism must travel in a straight line and therefore must cut in a straight line.

It will be found desirable in most cases to have the cutting mechanism cut steadily along a horizontal line, as well as in a single plane substantially. If the ground is uneven it would be impossible to avoid vertical deviation downwardly and upwardly from the desired travel of the cutting mechanism unless rails of the kind suggested, or some similar mechanism, are utilized.

Having determined whether to use a guide or rails, the next step is to properly position the rail, for example, in accordance with the depth to which it is desired to cut the hedge. This being done, the machine is then placed upon the guide with the casters which are nearer the hedge inserted in the track of the guide and with the other casters rolling on the ground. The next step depends upon whether one side or more of the hedge is to be trimmed at one time. If only one side is to be trimmed at one time, for example, the nearest side of the hedge, then it is only necessary to adjust one of the cutting units between the front uprights of the machine, as, for example, the unit 41 as shown in Fig. 1. This is accomplished by inserting the frame containing the motor and cutting equipment and registering the apertures in the frame with the apertures in the uprights nearest the desired height, and inserting bolts through the apertures of the uprights and the frame. Upon this being done the machine may be located on the guide at a point near the beginning of the hedge, and the power may be turned on. This will cause knives to begin rotating, and as the knives rotate the machine is pushed on the guide in a manner parallel to the face of the hedge which is to be cut. When the machine has reached the end of the track or hedge, the unit may be elevated or lowered as desired by registering the apertures on the frame with the higher or lower apertures of the uprights, and inserting the bolts. This being done, the machine will be moved along the hedge again and this operation is continued until the entire face of the hedge is cut.

If it is desired to trim the top of the hedge then the horizontally movable guide with sides 23 and rear portion 24 is inserted between the cross bar 20, and the rear cross bar 21. These cross bars are adjusted vertically as shown in Fig. 3. The uprights are provided with apertures as are the cross bars. The apertures of the bars are registered with the apertures of the uprights at desired heights, and bolts are inserted to secure the cross bars to the uprights. A horizontally movable guide is constructed to support a frame containing a motor and the cutting means which is slidable on the said guide. The unit to be used on this guide may be the unit 40 which is shown in Fig. 1, which is similar to the other units, or it may be the unit 41. When the operation is not required to be simultaneous, the unit 41 may be withdrawn from the uprights and attached to the horizontally movable guide. As was formerly described, the machine is positioned in the beginning of the rail or guide and the power is turned on, and the machine is pushed forward along the rail or guide. The cutting mechanism will then operate to trim the top of the hedge evenly and neatly. If the hedge is too broad for the unit to trim the entire top in one travel of the machine, the unit may be moved laterally by sliding upon the horizontally movable guide, and the machine may be caused to again travel over the top of the hedge.

In case it is desired to trim the rear of the hedge, the vertical guide 25 is attached to the horizontally movable guide. This vertical guide 25 is equipped with apertures the same as the upright member of the machine, and a unit may be positioned in said vertical guide by means of the apertures and bolts in the same manner as hereinbefore described. The horizontally movable guide may be moved laterally so as to bring the face of the cutting mechanism into the desired contact with the face of the hedge. As indicated before, if simultaneous operation for three sides of the hedge is required, three units will be necessary. If it is necessary to trim only one face at a time, only one unit is necessary, and this unit may be transposed as indicated by the different supporting means.

In trimming the rear side of the hedge, if it should be found that the depth of the hedge is so great that it will require lateral adjustment of the horizontally movable guide, to such an extent as to over-balance the machine, the extension of the frame of the machine is available for counter-weights.

In case there are portions of the hedge which are difficult of access by the machine, anyone of the units may be withdrawn from the machine and applied by hand to the said portion.

While horizontal rails and guides are shown, these are subject to considerable modification so as to make them available to cut objects of various configurations and sizes, and the construction and arrangement shown in the accompanying drawings admits of considerable modification without departing from the spirit and scope of the invention as defined by the appended claims. The invention, therefore, is not limited to the specific details of structure as shown and described.

Having thus described my invention, what I claim as new and desire to secure by Letters Patent is:

1. In a machine for cutting hedges and the like, a carriage movable relative to a hedge to be cut, apertured vertical uprights mounted on said carriage, cutting means supported by said vertical uprights for cutting the foremost side of a hedge including a horizontal supporting member having a flanged and bored housing, a motor contained in said bore, a shaft in said motor, blades provided on said shaft, a horizontal supporting member movably mounted in said uprights, and similar cutting means adjustably mounted in said horizontal supporting member for simultaneously cutting the top of a hedge, an apertured vertical supporting member supported by said horizontal supporting member, similar cutting mechanism adjustably mounted in said vertical supporting member for cutting the rearmost side of a hedge.

2. In a machine for cutting hedges and the like, a carriage movable relative to a hedge to be cut, apertured vertical uprights mounted on said carriage, cutting means adjustably supported by said vertical uprights for cutting the foremost side of a hedge including a horizontal supporting member having a flanged and bored housing, a motor contained in said bore, a shaft in said motor, blades provided on said shaft, and a frame for ordering the material to be cut, a horizontal supporting member movably mounted in said uprights, and similar cutting means adjustably mounted in said horizontal supporting member for simultaneously cutting the top of a hedge, an apertured vertical supporting member supported by said horizontal supporting member, similar cutting mechanism adjustably mounted in said vertical supporting member for cutting the rearmost side of a hedge.

3. In a machine for cutting hedges and the like, a carriage movable relative to a hedge to be cut, apertured vertical uprights mounted on said carriage, cutting means supported by said vertical uprights for cutting the foremost side of a hedge including a horizontal supporting member having a flanged and bored housing, a motor contained in said bore, a shaft in said motor, blades provided on said shaft, a horizontal supporting member movably mounted in said uprights, and similar cutting means adjustably mounted in said horizontal supporting member for simultaneously cutting the top of a hedge, an apertured vertical supporting member supported by said horizontal supporting member, similar cutting mechanism adjustably mounted in said vertical supporting member for cutting the rearmost side of a hedge, and an extension of the flooring of said carriage for counterweights to maintain a balance.

In testimony whereof I have signed my name to this specification.

WILLIAM H. SIKMA.